M. C. COSGRAY.
ELECTRIC SYSTEM.
APPLICATION FILED DEC. 29, 1915.
1,404,932.
Patented Jan. 31, 1922.
3 SHEETS—SHEET 3.
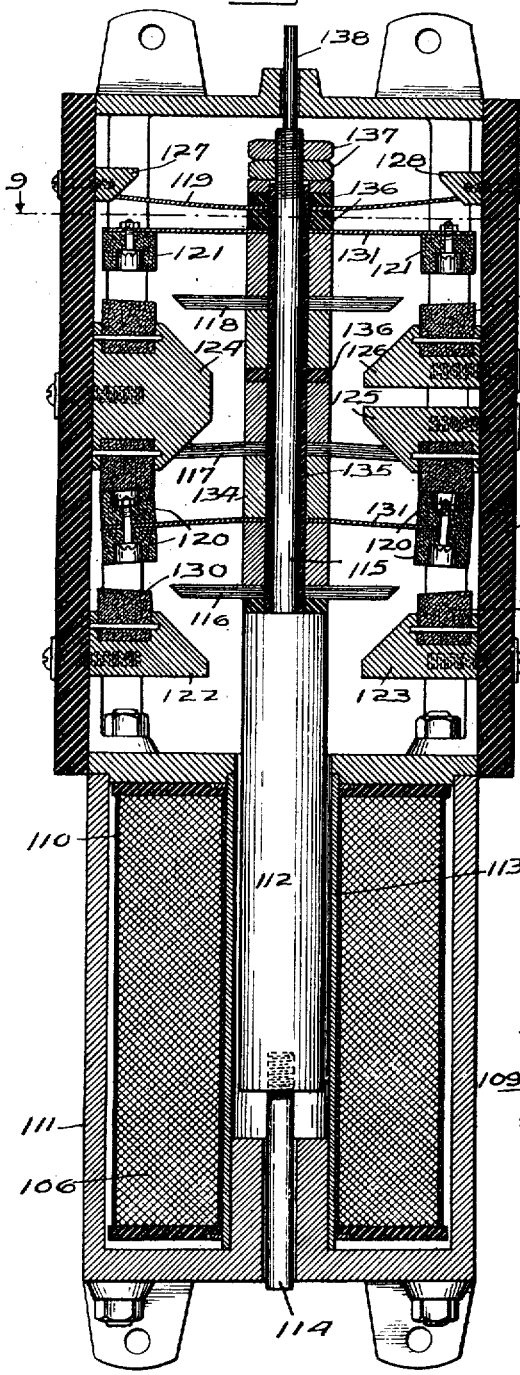
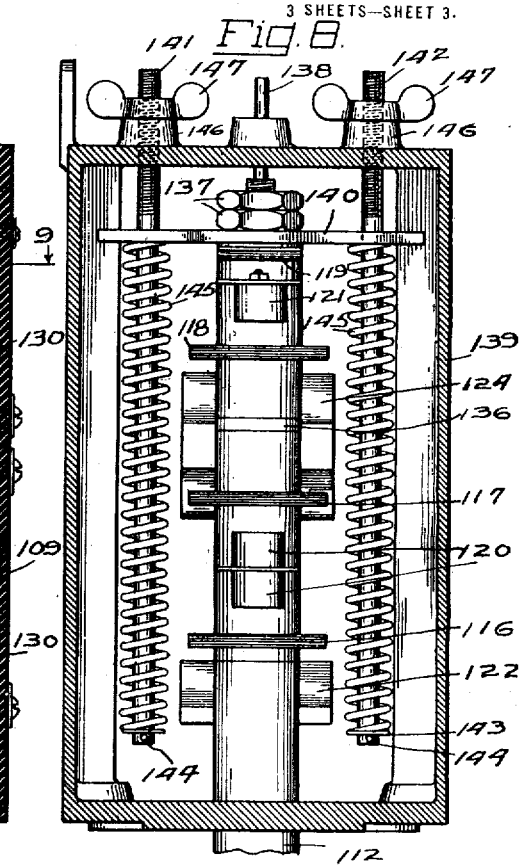
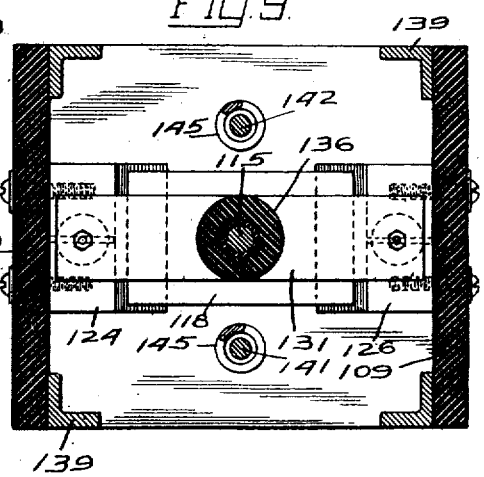
INVENTOR
Mark C. Cosgray,
by
Owen, Owen & Crampton.

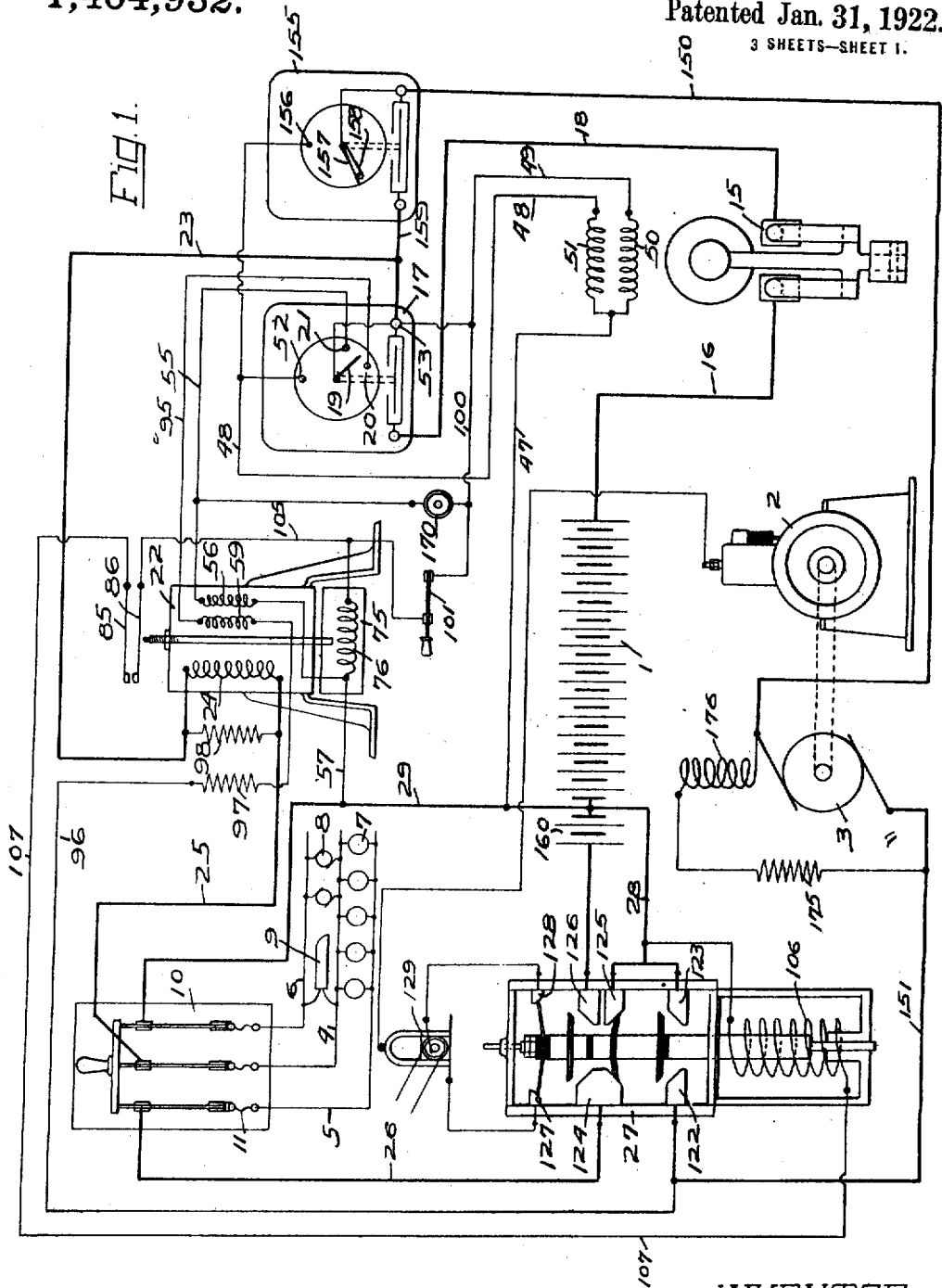

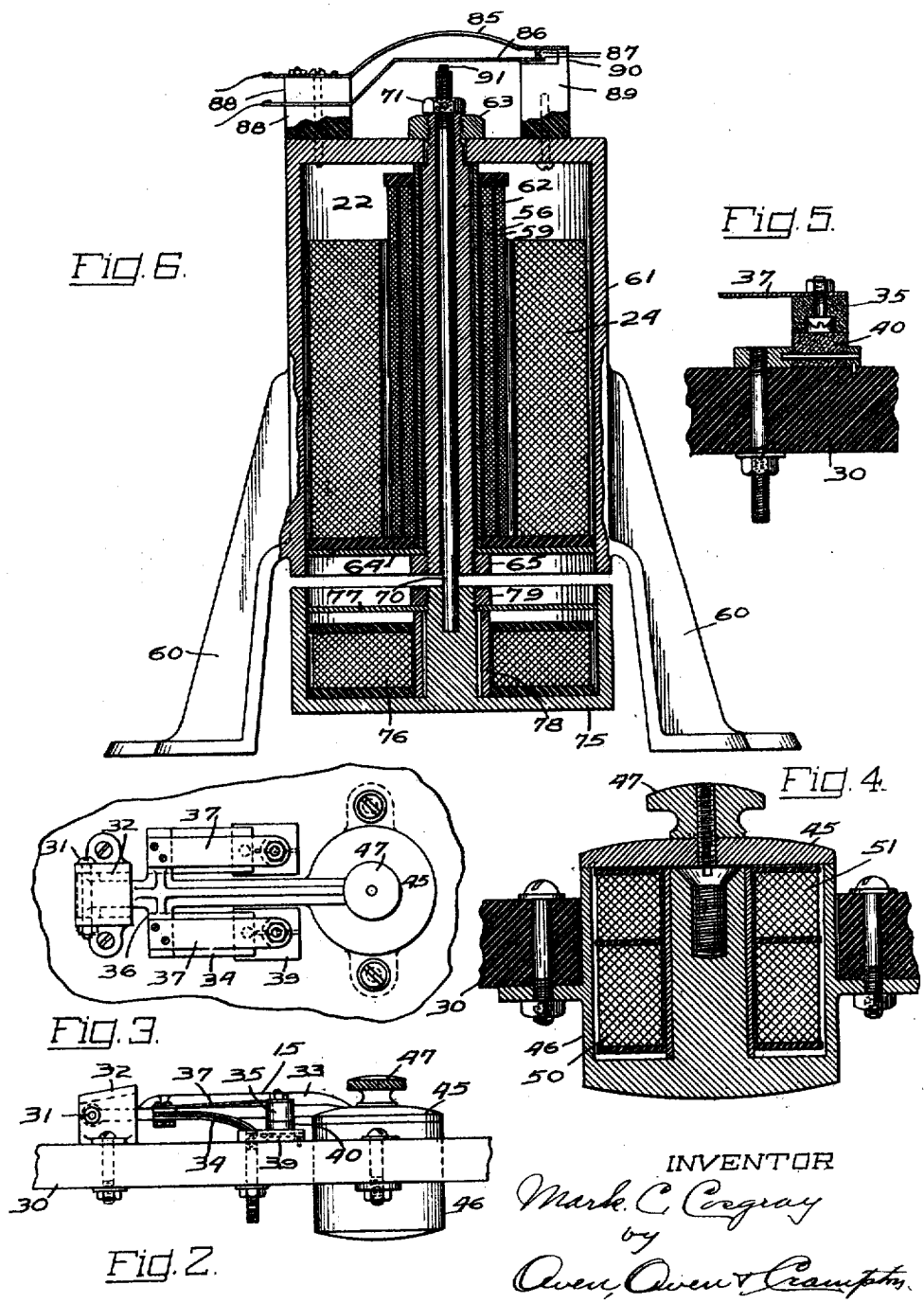

UNITED STATES PATENT OFFICE.

MARK C. COSGRAY, OF PORT CLINTON, OHIO, ASSIGNOR TO THE MATTHEWS BOAT COMPANY, OF PORT CLINTON, OHIO.

ELECTRIC SYSTEM.

1,404,932.     Specification of Letters Patent.     Patented Jan. 31, 1922.

Application filed December 29, 1915. Serial No. 69,250.

*To all whom it may concern:*

Be it known that I, MARK C. COSGRAY, a citizen of the United States, and a resident of Port Clinton, in the county of Ottawa and State of Ohio, have invented a certain new and useful Electric System; and I do hereby declare the following to be a full, clear, and exact description of the invention, such as will enable others skilled in the art to which it appertains to make and use the same, reference being had to the accompanying drawings and to the characters of reference marked thereon, which form a part of this specification.

My invention relates to electric systems, and it has for its object to provide a unitary battery system for feeding electricity consuming devices, which is co-ordinated with a battery charging system. It further provides regulating devices which control the current supplied to the system, and which intercontrol the charging devices and the current that is consumed so as to supply the current either to the battery or to the consuming system, according to the watts consumed by the system. Also by my invention is provided a storage battery and a generator system wherein the current will be supplied by the battery or generator, or both, to a consuming system of translating devices, depending upon the wattage consumed or translated in the translating devices.

The invention may be contained in many forms of systems and arrangements of parts usable for different purposes, all of which come within the purview of my claims hereinafter appended. To show the practicability of my invention, I have selected an electric system of current supply, consuming and controlling devices, as an example of the systems and constructions containing the invention, and shall describe them hereinafter. The system and the devices selected are illustrated in the accompanying drawings.

Referring to the drawings, Figure 1 is a diagrammatic illustration of the connections, the devices being shown conventionally. Fig. 2 is an automatic switch for opening the main line. Fig. 3 is a top view of the switch, and Fig. 4 is a vertical sectional view of the magnet of the switch. Fig. 5 illustrates in detail the carbon contacts of the switch illustrated in Fig. 2. Fig. 6 is a vertical sectional view of an automatic intercontrolling switch. Fig. 7 is a vertical sectional view of a master switch. Fig. 8 is a sectional view taken at right angles to the plane on which the section is taken, of which Fig. 7 is a view. Fig. 9 is a horizontal sectional view taken on the line 9, 9 indicated in Fig. 7.

Referring to Fig. 1, 1 is a storage battery. 2 is an engine which operates a generator 3 to change the storage battery 1. The generator 3 is shunt wound so that it will operate as a motor when the current from the battery 1 passes through the field coil. The armature of the generator being connected to the engine, it will operate to start the engine, and when the engine is in operation, the engine will drive the generator to produce a current. 4 is the main supply line of the consuming system, having two return lines 5 and 6. Translating devices are located intermediate the supply wire 4 and the return wires 5 and 6. Translating devices requiring a small amount of current, such as electric lamps 7, are located between the lines 4 and 5, while translating devices requiring larger current, such as motors 8, and heating devices, such as the flat iron 9, are located between the lines 4 and 6. A three-bladed switch 10 connects the consuming system with the supply system and the controlling devices. The switch 10 may also be provided with fuses 11 of the form well known in the art. When it is desired to connect the consuming system with the controlling devices and the source or sources of current supply, the switch 10 is closed.

The storage battery current, in supplying the system having the translating devices, passes through a main line safety switch 15 illustrated in Fig. 2, to which the battery is connected by the wire 16 and through an ampere-hour meter or coulomb meter 17, the ampere-hour meter being connected to the switch 15 by means of the wire 18. The ampere-hour meter is of the type known commercially as the Sangamo ampere-hour meter. As is well known, it has an electrical means for causing rotation of the pointer and contact 19. As the current passes from the battery through the ampere-hour meter 17, the pointer rotates counterclockwise and passes from the fully charged or 100% battery charged point, on which the contact 20 is located, to the 85% battery charged point, on which the contact 21 is located. The meter 17 is connected to the automatic intercontrolling switch 22 illustrated in Fig. 6, by the wire 23. It passes through the series coil 24 of the automatic intercontrolling switch and through the wire 25 which connects the coil 24 with the main line 4 of the consuming system. Thence the current passes through the translating devices to the lines 5 or 6 or to both of the lines. From the line 5 it returns through the wire 26 to the master switch 27 illustrated in Fig. 7, thence to the wire 28 which completes the circuit to the storage battery 1, and from the line 6 it passes through the line 29 to the battery 1.

The main line safety switch 15, illustrated in Figs. 2, 3, 4 and 5, is suitably supported on a switch-board 30 formed of slate or suitable composite insulating material by means of the pivot pin 31 which is supported in a housing 32. The switch arm 33 extends from within the housing and is provided with leaf contacts 34 and with spring pressed carbon contacts 35. The contacts 34 and 35 are connected to a cross arm 36 which is connected to or formed integral with the switch arm 33. The springs 37 which carry the carbon contacts 35 are so supported and tensioned that in closing the switch, the carbon contacts are closed before the metal leaf contacts are closed, and are opened subsequent to the opening of the metal leaf contacts. The carbon contacts thus break the circuit later and take any arcing that may be produced by reason of the opening of the switch 15. The switch arm, when closed, is located in a vertical position so that when it is released, the springs 37 and the leaf contacts throw the switch arm forward. The leaf contacts 34 make contact with fixed metallic contacts 39, and the carbon contacts 35 make contact with coacting fixed carbon contacts 40, which are secured to the contacts 39. The outer end of the arm 33 is provided with a disk armature 45, which is located above a cup or iron-clad magnet 46 which is also secured to the switch-board 30. The armature 45 is provided with a handle or knob 47, whereby the switch arm 33 and the armature 45 may be easily manipulated.

The magnet 46 is provided with two coils,—one is the coil 50 which is so connected in the system that when the switch 15 is closed, the current will pass through the coil 50 and hold the armature 45 down, and consequently hold the contacts 34 and 35 closed, while the coil 51 is so connected in the system that when the storage battery is discharged to such an extent that there is danger of causing damage to the plates of the battery, the coil 51 will be automatically connected in the circuit, and permit the switch 15 to be opened by the springs 38. The coil 51 is wound in the direction opposite to that in which the coil 50 is wound, or the connections are such that when the circuit of the coil 51 is completed, it passes in a direction opposite to that in which the current passes through the coil 50 to cause substantial de-energization of the magnet and thus relieves the armature 45, which under the operation of the spring 29, causes the switch 15 to open. This prevents any further consumption of electricity stored in the battery 1.

The coil 50 is connected to the binding post 53 of the meter 17, and when the switch 15 is closed to allow the current to pass through the wires 16 and 18 to the meter 17, and to the binding post 53, line 49, coil 50, line 47, line 29 to the battery 1, the magnet becomes energized and holds the switch 15 closed.

The coil 51 is connected to the meter 17 by means of the wire 48. The meter 17 is provided with a battery zero point having the contact 52, to which the wire 48 is connected. The zero point is the danger point of the discharge of the battery. If the needle 19 should pass the 85% battery charged point as it passes counterclockwise around the dial of the meter, while the battery is discharged, and reaches the substantial zero point 52, a circuit is completed from the meter 17 through the binding post 53, pointer 19 to the contact point 52, the kick or release coil 51, back to the storage battery 1. This causes the switch 15 to be opened and the flow of the current discontinues.

The needle 19, during the discharge from the 100% battery charged point 20, passes over the contact 21 located at the 85% battery charged point, whereupon the circuit is completed from the battery through the wires 16 and 18, the pointer 19, contact 21, thence it passes through the wire 55 to the automatic intercontrolling switch 22 and through a coil 56, wire 57, wire 29, to the storage battery 1. Meantime, the current is also passing through the wires 16 and 18, the meter 17 and the series coil 24 to the consuming system. The coil 56 is thus affected by the electro-motive force of the battery 1, while the coil 24 is affected by the value of the current, that is, its amperage. The two coils 24 and 56, operating together, operate the automatic intercontrolling switch. If the switch 10 is open, the coil 56 alone will operate the switch 22 when the circuit is completed between the pointer 19 and the contact 21. Also, if the current consumed is large enough, the coil 24, alone, will operate the switch 22. When the battery is charged, the pointer 19 completes a circuit through the coil 59 which counteracts the coil 24, as hereinafter described.

The switch 22 is supported by means of brackets or legs 60. The switch is provided with an inverted cup or cylinder 61 in which are located the coils 24, 56 and 59. The switch is also provided with a central pole 62, which extends through the coils. The pole 62 is suitably clamped in the bottom of the inverted cylinder 61. Its upper end extends through an opening formed in the bottom of the cylinder 61 and is secured in position by means of the nut 63. The lower end of the pole 62 is provided with a disk 64, of non-magnetic material, which closes the lower end of the cylinder 61. The disk 64 is secured in position by means of a nut 65 which is threaded on the lower end of the pole 62. The pole 62 is hollow, forming a sleeve in which is located a rod 70 which extends through the pole 62. The upper end of the rod 70 is provided with a nut 71, which is threaded on the rod 70 and forms an adjustable stop. The lower end of the rod is secured to a cup armature 75, in which is located a coil 76. The cup armature 75 is closed by means of a disk 77 of non-magnetic material. The disk 77 is secured in position between a bushing 78 and a nut 79. The nut 79 is threaded on the central pole of the iron-clad magnet which is thus formed. The edges of the cups 75 and 61 have substantially the same diameters and are located in opposing relation with respect to each other. On top of the cup or cylinder 61 is located a pair of spring contacts 85 and 86 having platinum points 87. They are supported and separated by insulating blocks 88 which are secured to the top of the cup or cylinder 61. The free ends of the elastic contacts 85 and 86 normally rest against the anvil 89. The anvil 89, having an upwardly extending ridge 90, operates to open the spring contacts when they are released. The upper end of the rod 70 is provided with an insulating point 91. When the rod 70 is raised by the magnetization produced in the cup 61 by the coil 24, or the coils 24 and 56, the point 91 is pressed against the contact 86, which in turn closes the platinum points 87 and completes the circuit through the contacts 85 and 86. This will complete the circuit to the master switch and start the engine and generator to recharge the battery, as described hereinafter. They will operate until the pointer contact reaches the contact 20, whereupon the circuit will be completed to the coil 59.

The coil 59 is wound in a direction opposite to that in which the coils 24 and 56 are wound, or is so connected in the circuit that the current passes through the coil 59 in a direction opposite to that in which it passes through the coils 24 and 56, so that coaction of the coil 59 and the weight of the armature 75 will overcome the freezing action of the magnetic materials of which the cups or cylinders 61 and 75 are composed, and open the switch 22. It being connected to the 100% battery charged point 20 of the meter 17, so that when the pointer 19 makes contact with the contact 20 located on the 100% battery charged point, the circuit will be completed from the positive side of the battery and generator 3, to the pointer 19, and through the line 95, the kick or release coil 59, and through the line 96 to the master switch 27, thence it is completed to the battery 1.

To secure accurate magnetic effect, a resistance coil 97 is connected in series with the coil 59, which may be adjusted during the assembling of the switch-board to obtain the desired results in the operation of the kick or release coil 59. Also, the series or current coil 24 is connected to a shunt resistance coil 98 for the purpose of securing the desired magnetic effect of the coil 24. The resistance of the coil 98 is varied according to the specified load that the system is to carry, and also according to the conditions and operations of the automatic intercontrolling switch 22.

The coil 76 of the armature 75 is also a shunt connected coil. It is connected to the positive terminal of the battery through the lines 16 and 18, the meter 17 and line 100 and by lines 57 and 29, to the negative terminal.

The contacts 85 and 86 are also connected in a branch of the circuit from the meter 17 which is connected to the positive teminal of the storage battery through the lines 16 and 18. The contact 86 is connected through the line 105 to the meter 17, while the contact 85 is connected to the coil 106 of the master switch. The coil 106 is connected to the negative terminal of the storage battery 1 through the line 28. When the contacts 85 and 86 are closed, the magnet of the master switch is energized by the coil 106, and causes the operation of the master switch.

The switch 101 is located in the branched circuit having the coil 76, the contacts 85 and 86 and the coil 106, and in operation is kept closed.

The master switch 27, illustrated in Figs. 7, 8 and 9, is also provided with an iron-clad magnet 110 having the shell 111 and the movable core 112. The coil 106 is inserted in the shell in the manner well known in the art. The core 112 may be surrounded by a bushing 113 of non-magnetic material. The movable core 112 may also be provided with a guide pin 114, likewise formed of non-magnetic material. The movable core 112 is provided with a rod 115 which forms a binding rod for securing the contacts and insulating blocks to the core 112. The switch is provided with the leaf spring contacts 116, 117, 118 and 119, and with the carbon contacts 120 and 121 which complete the circuit to the fixed contacts 122, 123, 124, 125, 126, 127 and 128, the contacts 122 to 126 inclusive being provided with coacting carbon blocks 130, with which the movable contacts make contact. They are set into recesses formed in the contacts 122 to 126 inclusive in any suitable way. The fixed contacts are secured to insulating panels 109, secured to corner members 139. The movable carbon contacts are connected to the core 112 through the rod 115 and spring strips 131. The spring strips are so tensioned and adjusted that the circuits will be closed before and opened after the closing and opening of the leaf spring contacts, by the carbon contacts.

The movable contacts are secured between blocks supported on an insulating bushing 135, located on the rod 115. The contacts 118 and 121 are insulated from the contacts 116, 117, 119 and 120 by blocks 136 of insulating material which are also supported on the fiber bushing 135. The blocks 134 and the washers 136 are secured in position by the nuts 137 which are threaded on the upper end of the rod 115. The rod 115 may also be provided with a pin 138 which extends through the end wall of the casing or chamber containing the contacts of the switch. The pin will operate as a guide to the core and movable contacts.

A cross-bar or strip 140 is also secured to the end of the rod 115, by means of the clamp nuts 137. The cross-bar is provided with openings through which rods 141 and 142 extend. The lower ends of the rods are provided with washers 143 and pins 144 for holding the washers in position. Compression springs 145 are located on the rods 142 and yieldingly push the core 112 out of the magnet 110 when it is de-energized. The rods 141 and 142 are threaded at their upper ends and extend through openings and bosses 146 located in the upper end of the case containing the contacts. Thumb nuts 147 are threaded on the rods 141 and 142, and consequently, the tension of the springs may be adjusted by the thumb nuts 147.

When the coil is deenergized, the circuit is completed across the fixed contacts 124 and 125, and across the contacts 127 and 128. When the core is pulled down by magnetization of the magnet, the circuit is broken between the contacts 124 and 125, and 127 and 128, and is completed across the contacts 124, 126, and 122 and 123.

When the circuit is completed from the positive side of the storage battery through the lines 16 and 18, the instrument 17, lines 100, 105, contacts 85 and 86, and through the line 107, the coil 106 of the master switch, line 28 to the battery 1, the circuit through the contacts 124, 125, and also the circuit through the contacts 127 and 128 are opened, while the circuit through the contacts 124 and 126, and the circuit through the contacts 122 and 123 are closed.

When the connection between the contacts 122 and 123 is completed, the current passes from the meter 17 which is connected to the positive side of the battery through the lines 16 and 18 to the shunt wound generator 3, through the instrument 155 and the line 150, the generator 3, the line 151, the contacts 122 and 123, and the line 28 to the negative side of the battery. This causes rotation of the armature of the generator and turns the shaft of the engine 2. The magneto is also rotated and the short circuit of the magneto, which is completed through the contacts 127 and 128, being opened, will cause the sparking of the plugs of the engine 2.

The instrument 155 in the circuit of the generator controls the switch 15. The coil 51 of the switch 15 is connected not only to the zero battery charged point 52 of the instrument 17 by the line 48, but it is also connected to the point 156 of a similar instrument 155 which is provided with a pointer 157 having an adjustable stop 158. In the operation of the instrument 155, the pointer 157 will be turned by the current passing through the instrument clockwise, and if sufficient current passes through the instrument 155, connection is completed through the pointer 157 to the contact 156. The instrument 155 is adjusted to cause rotation of the pointer 157 much more rapidly than the pointer 19 of the instrument 17 is rotated, and if connection is made through the pointer 157 and the contact 156, the kick or release coil 51 will be operated to open the switch 15, which will break the circuit through the battery. The pointer may be adjusted to prevent prolonged operation of the generator when acting as a motor to start the engine 2. As the current passes through the instrument 155, the contact pointer 157 moves clockwise toward the contact 156 during an interim which is sufficient to permit the engine to start if under normal conditions. The time given in starting the motor may be varied by the stop adjusting arm 158 which may be turned to the right or to the left to reduce or increase the length of time that the engine may be turned by the generator 3 acting as a motor. When the pointer 157 reaches the contact 156, the circuit of the release coil 51 will be completed from the instrument 17 which is connected with the positive pole of the battery through the lines 16 and 18, and is completed to the battery through the lines 159, instrument 155, pointer 157, contact 156, line 48 and lines 47 and 29. This will cause the switch 15 to open and break the circuit of the battery which is now feeding current to the generator 3 while operating as a motor, whereupon the generator 3 will discontinue in its operation and the circuit of the battery will be left open.

If the engine starts before the pointer 157 reaches the contact 156, it will turn the armature of the generator at a higher speed than it was previously turned while acting as a motor and the current will be fed to the battery through the line 150, the instrument 155, the coulomb meter 17, the line 18, the switch 15 and the line 16, the circuit being completed through the line 28, the contacts 122, 123, which are now closed, and the line 151. This will charge the storage battery. Inasmuch as the current, in charging the storage battery, passes in a direction opposite to that in which it passes while the battery is being discharged, in starting engine, the current through the instrument 155 will cause the pointer 157 to move counterclockwise until it reaches the adjustable limiting arm 158, whereupon the pointer 157 will be held against the adjustable arm 158 and will thus be in readiness for a succeeding operation of the instrument 155. The pointer 19 of the instrument 17 will be rotated clockwise toward the 100% battery charged point as the battery is being charged.

The generator will not only charge the storage battery, but it will also feed the consuming system having the translating devices, through a branched circuit, namely, through the lines 150, instrument 155, line 23, coil 24, lines 25 and 4, where the circuit branches and goes through the translating devices 8 and 9, lines 6, 29, 28, contacts 123, 122, and line 151, to the generator, and also through translating devices 7, lines 5 and 26, contacts 124, 126, battery 160, line 28, contacts 123 and 122, and line 151 to the generator 3. The lamps or other translating devices 7 are of a form which require a potential substantially the same as that of the battery 1, and inasmuch as the electro-motive force of the generator is higher than that of the battery, the counterelectromotive force of the cells 160 reduces the voltage impressed upon the translating devices 7 located between the lines 4 and 5, while the translating devices 8 and 9 will operate on the higher potential produced by the generator.

While the generator is charging the storage battery and the current is flowing through the line 150 and the instruments 155 and 17, lines 18 and 16, to the battery, the pointer 19 moves clockwise to the 100% battery charged point and makes contact with the contact 20 located on the point. This completes a circuit from the binding post 53 of the instrument 17 which is connected through the instrument 155 and the line 150 to the generator 3 and passes from the contact point 20 through the line 95, to the kick or release coil 59, and through the resistance coil 97, line 96, line 151, to the generator 3. The coil 59, which tends to produce polarity in the switch 22 opposite to that produced by the coil 24, and the weight of the armature 75 coöperate to release the armature, causing the circuit of the coil 106 to be opened, the contacts 85 and 86 being permitted to separate by the downward movement of the rod 70. This releases the core 112 of the master switch and permits the springs 145 to open the circuit between the contacts 122 and 123, and also opens the circuit between the contacts 124 and 126, and returns the switch to the position wherein the translating devices are fed by the storage battery 1.

In the operation of the system, assume that the pointer 19 is at a point intermediate the contacts 20 and 21, which correspond respectively to the 100% and 85% battery charged points. As the battery is discharged, the current passing through the instrument 17 will cause the pointer to move toward and finally make contact with the contact 21, which will close the circuit through the coil 56 to the battery through the lines 57 and 29, which will coact with the coils 24 and 76, the coil 24 being fed by the current from the battery through the instrument 17, the lines 23, and through the consuming system, and then to the battery through the lines 26, 28 and 29; while the coil 76 is located in a shunt circuit completed by the switch 101, as heretofore described. This will cause the automatic intercontrolling switch 22 to close the contacts 85 and 86, which will complete the circuit of the coil 106 through the lines 16, 18, 100, 105, 107 and 28, which operates the master switch and causes the engine to be started. The controlling switch 22 is maintained in closed position, notwithstanding the fact that when the generator charges the battery, the pointer 19 will be removed from the contact 21 which breaks the circuit of the coil 56.

The master switch, when closed, will cause a current to flow from the storage battery 1, through the line 150, the generator 3, line 151, to the battery, and cause the generator to operate as a motor to start the engine, which when started, will rotate the armature of the generator 3 at a higher speed, and generate a current which will flow through lines 150, 18 and 16, to the battery 1, lines 28 and 151, unless the contact pointer 157 reaches the contact 156, in which case the switch 15 will be opened by the coil 51, producing a polarity opposite to that produced by the coil 50, the circuit being completed from the battery through the lines 16 and 18, contacts 157 and 156, line 48, coil 51, and line 47. When the pointer 19 reaches the contact 20 or the 100% battery charged point, the circuit will be completed from the terminal 53 to the kick or release coil 59, thence to the generator which opens the circuit through the contacts 85 and 86 and the coil 106, which opens the circuit of the generator to the battery which is completed through the contacts 122 and 123, and restores the connection of the translating system to the battery 1, which is completed through the contacts 125 and 124.

If, however, the contact pointer 19 should pass the contact point 21 without causing operation of the automatic intercontrolling switch 22, the battery will continue to be discharged below the 85% battery charged point until it reaches the contact at the zero point, that is, until the contact pointer reaches the contact 52. The circuit will then be completed from the binding post 53 through the pointer 19, the contact 52 the line 48, to the kick or release coil 51, lines 47 and 29 to the battery 1, which will open the switch 15, and thus break the circuit of the battery 1 to prevent any damage thereto.

If any part of the consuming system requires a current greater than that that may be properly supplied by the battery 1, such as one of the translating devices 8 or 9 located intermediate the lines 4 and 6, it will, on account of the increased wattage thus consumed, cause the automatic intercontrolling switch to be operated so as to close the contacts 85 and 86. The large current, which at this time is passing through the line, passes through the current coil 24 of the automatic intercontrolling switch 22 and the increased ampere turns of the coil assisted by coil 76 cause the armature 74 to be lifted without the assistance of the coil 56 and start the generator 3, as heretofore described. So that the system provides a means whereby current will be supplied by the generator if the watts consumed is in excess of that which may be ordinarily supplied by the battery. The generator will thus automatically take upon itself the load when the watts consumed is greater than that that can ordinarily be supplied by the battery 1. Also, the battery may supply part of the current if the watts consumed is greater than that that can be supplied by the generator 3. Also, the generator 3 may not only supply the current in the consuming system, but also charge the storage battery 1. If the current which passes through the coil 24 is large, the contacts 85 and 86 will be held closed by the magnetization produced by the coils 24 and 76, although the pointer 19 may be carried to the contact point 20 which completes the circuit through the release coil 59. The battery may continue to be charged until the lead salt or oxide is be separated and further charging of the battery causes electrolysis of the water producing no useful work on the battery. When however, the current through the system containing the translating devices is reduced, and the circuit through the coil 106 is opened to turn the load wholly upon the battery 1, the pointer 19 will immediately begin to move from the 100% battery charged point of the storage battery towards the 85% battery charged point.

The release coil 59, being connected through the line 96 to the contact 122 of the master switch which is open under normal operation, but is closed when there is an overload in the supply system, or when the battery is discharged to the 85% point, prevents the counteraction of the coil 59 when the overload is placed on the system so that the master switch will operate at once, even though the pointer 19 of the ampere-hour meter 17 stands at the full point, that is, even though the pointer 19 is in contact with the contact 20. If the overload is suddenly taken off of the supply system, the potential rises to a peak and increases the current through the coil 59, which is in shunt connection in the circuit and permits immediate action of the automatic intercontrolling switch 22 to break the circuit through the coil 106 of the master switch. The circuit of the potential coil 56, being open at this time, does not co-operate with the coil 24, so that the automatic intercontrolling switch 22 is immediately opened when the overload is removed, and the battery continues to provide the current for the supply system.

Also taking the case where the generator is running, having been started either by contact at the 85% charging point 21, or by a current supplying an overload and acting through coil 24, the generator will charge the battery until pointer 19 is in contact with point 20. If the wattage consumed by the translating devices is below a predetermined amount (this amount being fixed by what is considered a safe amount for the batteries to carry without the aid of the generator) the generator will be shut down through the action of coil 59 operating the master controller 22. If, however, the wattage consumed by the translating devices is more than the above mentioned predetermined amount the master controller 22 will remain closed because the counteracting action of coil 59 will not be sufficient to overcome the action of coil 24. When the wattage consumed by the translating devices is reduced suddenly or slowly, as for example by turning off one light at a time to the predetermined amount, so that the action of coil 24 no longer overbalances the action of coil 59 but coil 59 becomes predominant, then the master controller 22 is opened and the generator and engine are stopped.

When it is found desirable to start the charging of the battery, as for example, when the pointer 19 is intermediate the 85% battery charged point and near the danger or discharged point of the battery, the push button 170, which is parallel with the contacts 19 and 21, is pressed, which completes a circuit from the line 55 to the line 100, whereupon the generator will, under normal conditions, automatically start to charge the storage battery 1.

A suitable resistance 175 is located in series with the shunt coil 176 of the generator 3 to adjust the current that will pass through the shunt field coil 176 to produce the requisite lines of force in the field of the generator 3.

The system selected and described may be greatly modified in the arrangement of its parts in the manufacture of devices connected in the system, and in the substitution of elements having equivalent functions, and such modifications may be used for many purposes and still contain the invention.

Having thus described my invention, what I claim as new, and desire to secure by Letters Patent, is—

1. In an electric system, the combination of a storage battery, translating devices located in the circuit of the storage battery, a source of current supply connected to the battery, a magnetically operated switch located in the circuit of the source of supply, a magnetic switch located in the circuit of the source of supply and of the battery and in the circuit of the translating devices, an instrument controlling the said switches for closing and opening the first named switch and for opening the second named switch when predetermined quantities of current of certain directions have passed through the instrument.

2. In an electric system, the combination of a storage battery, translating devices located in the circuit of the storage battery, a source of current supply connected to the battery, a magnetic switch located in the circuit of the source of supply, a circuit-closer for controlling the magnetic switch and having a magnetic coil located in the circuit of the translating devices to close the circuit when the translating devices overload the battery, and having a magnetic coil counteracting the first named coil, and an automatic means operated by the current of the battery for connecting the second named coil to the battery when the battery is charged.

3. In an electric system, the combination of a storage battery, translating devices connected to the battery, a motor connected to the battery in parallel with the translating devices, a pair of instruments, one connected in the circuit of the translating devices, and the other connected in the circuit of the motor, a magnetically controlled switch operated by the instrument in the circuit of the translating devices for closing the circuit of the battery, and a magnetically operated switch operated by the instrument connected in the circuit of the motor for opening the circuit of the battery when predetermined quantities of current pass through the instruments.

4. In an electric system, the combination of a battery, translating devices connected to the battery, a motor connected to the battery, a pair of instruments, one connected in the circuit of the translating devices, and the other connected in the circuit of the motor, a magnetically controlled switch operated by the instrument connected in the circuit of the translating devices for closing the circuit of the motor, and a magnetically operated switch operated by the instrument in the circuit of the motor for opening the circuit of the motor when predetermined quantities of current pass through the last named instrument, an engine connected to the shaft of the motor for converting the motor into a generator when it is driven by the engine.

5. In an electric system, the combination of a battery, translating devices connected to the battery, a motor connected to the battery, a pair of instruments, one connected in the circuit of the translating devices, and the other connected in the circuit of the motor, a magnetically controlled switch operated by the instrument connected in the circuit of the translating devices for closing the circuit of the motor when predetermined quantities of electricity pass through the instrument, and a magnetically operated switch operated by the instrument connected in the circuit of the motor for opening the circuit of the battery when predetermined quantities of current pass through the last named instrument, an engine connected to the shaft of the motor for converting the motor into a generator when it is driven by the engine.

6. In an electric system, the combination of a storage battery, translating devices located in the circuit of the storage battery, a source of current supply, a magnetic switch for connecting the source of supply with the battery, a circuit-closer for controlling the magnetic switch and having a coil for opening the circuit-closer and a coil for closing the circuit closer and located in the circuit of the translating devices and means coacting with the first named coil to open the circuit-closer, the second named coil operating to close the circuit notwithstanding the action of the first named coil when the watts consumed by the translating devices overload the battery.

7. In an electric system, the combination of a storage battery, translating devices located in the circuit of the storage battery, a source of current supply connected to the storage battery, a magnetically operated switch located in the circuit of the source of supply, a circuit-closer controlling the switch and having a coil connected in the circuit of the translating devices and a pair of coils connected to the battery, one coacting with the first named coil, and the other counteracting the first named coil, and means for completing the circuit of one or the other of the pair of coils.

8. In an electric system, the combination of a storage battery, translating devices located in the circuit of the storage battery, a source of current supply connected to the storage battery, a magnetically operated switch located in the circuit of the source of current supply, a circuit-closer controlling the switch and having a coil connected in the circuit of the translating devices and a pair of coils connected to the battery, one coacting with the first named coil and the other counteracting the first named coil, an instrument located in the circuit of the translating devices and the source of current supply for completing the circuit of one or the other of the coils, according to the quantities and directions of current passing through the instrument.

9. In an electric system, the combination of a storage battery, translating devices located in the circuit of the storage battery, a source of current supply connected to the storage battery, a magnetically operated switch located in the circuit of the source of current supply, a circuit-closer controlling the switch and having a coil connected in the circuit of the translating devices and a pair of coils connected to the battery, one coacting with the first named coil and the other counteracting the first named coil, a magnetically operated switch located in the circuit of the translating devices, an instrument for completing the circuit of one or the other of the pair of coils, and for opening the switch in the circuit of the translating devices when predetermined quantities of current of certain directions pass through the instrument.

10. In an electric system, the combination of a battery, translating devices located in the circuit of the battery, a generator, a circuit-closer, a magnetically operated switch controlled by the circuit-closer for causing the magnetically operated switch to connect the translating devices in the circuit of the generator, when the load of the translating devices on the battery exceeds a predetermined wattage.

11. In an electric system, the combination of a battery, a motor, an automatic release switch connected in the circuit of the battery of the motor, a magnetically operated switch, a pair of instruments connected in the circuit of the battery and motor and to the automatic release switch, one instrument connected to the magnetically operated switch for connecting the motor to the battery when a predetermined quantity of current passes through the instrument, said pair of instruments having means for opening the release switch when a predetermined quantity of current passes through the instruments.

12. In an electric system, the combination of a battery, translating devices located in the circuit of the battery, a pair of magnetically operated switches located in the circuit of the battery, one of the switches for closing the circuit of the battery and the translating device, and the other of the switches for opening the circuit of the battery and the translating device, a pair of instruments connected in the circuit of the battery and the translating device, one of the instruments connected to the switch for opening the circuit of the translating device and for causing the switch to open the circuit, and the other connected to the switch for closing the circuit of the translating device and for opening the circuit of the translating device.

13. In an electric system, the combination of a battery, a translating device located in the circuit of the battery, a pair of magnetically operated switches located in the circuit of the battery, one of the switches for closing the circuit of the battery and the translating device, and the other of the switches for opening the circuit of the battery and the translating device, a pair of instruments connected in the circuit of the battery and the translating device, one of the instruments connected to the switch for opening the circuit of the translating device and for causing the switch to open the circuit, and the other connected to the switch for closing the circuit of the translating device and for opening the circuit of the translating device, when predetermined quantities of current pass through the said instruments.

14. In an electric system, the combination of a battery, a translating device located in the circuit of the battery, a magnetically operated switch for closing the circuit of the translating device, a magnetically operated switch for opening the circuit of the translating device, an instrument located in the circuit of the the translating device and connected to the said switches for closing the circuit of the translating device when a predetermined quantity of current passes through the instrument, and for opening the circuit of the translating device when a predetermined quantity of current passes through the said instrument, means for interconnecting the instrument and the switch for opening the circuit of the translating device.

15. In an electric system, the combination of a storage battery, translating devices located in the circuit of the storage battery, a motor connected to the storage battery, a pair of magnetically operated switches, one for closing the circuit of the motor, and the other for opening the circuit of the translating devices and the motor, an instrument for operating the said switches when predetermined quantities of current pass through the instrument.

16. In an electric system, the combination of a storage battery, translating devices located in the circuit of the storage battery, a motor connected to the storage battery, a pair of magnetically operated switches, one for closing the circuit of the motor, and the other for opening the circuit of the translating devices and the motor, an instrument for operating the said switches when predetermined quantities of current pass through the instrument, an engine connected to the shaft of the motor for converting the motor into a generator for charging the storage battery.

17. In an electric system, the combination of a storage battery, translating devices located in the circuit of the storage battery, a motor located in the branched circuit of the storage battery, a pair of magnetically operated switches, one for closing the circuit of the motor, and the other for opening the circuit of the translating devices and the motor, an instrument for operating the said switches when predetermined quantities of current pass through the instrument, a second instrument connected in the circuit of the motor for operating the switch for opening the circuit of the motor and translating devices when a predetermined quantity of current passes through the second named instrument, an engine connected to the shaft of the motor for converting the motor into a generator for charging the storage battery.

18. In an electric system, the combination of a battery, translating devices located in the circuit of the battery, a motor located in the branched circuit of the battery, magnetically controlled switches, one for closing and opening the circuit of the motor, and the other for opening the circuit of the motor and the translating devices, an instrument for operating the said switches, an engine connected to the shaft of the motor for converting the motor into a generator for charging the storage battery.

19. In an electric system, the combination of a battery, translating devices located in the circuit of the battery, a motor located in the branched circuit of the battery, magnetically controlled switches, one for closing and opening the circuit of the motor and the other for opening the circuit of the motor and the translating devices, an instrument for operating the said switches, an engine connected to the shaft of the motor for converting the motor into a generator for charging the storage battery, an instrument connected in the circuit of the motor for operating the switch for opening the circuit of the translating devices and the motor when a predetermined quantity of current passes through the motor unless the motor is converted into a generator.

20. In an electric system, the combination of a storage battery, translating devices located in the circuit of the storage battery, a motor located in a branched circuit of the battery, a magnetically operated switch for closing the circuit of the motor, a magnetically operated circuit-closer for controlling the magnetically operated switch connected in the circuit of the translating devices, an engine connected to the shaft of the motor for converting the motor into a generator, an instrument connected in the circuit of the motor, a switch controlled by the instrument for opening the circuit of the translating devices and the motor when a predetermined quantity of current passes through the instrument, unless the motor is converted into a generator.

21. In an electric system, the combination of a storage battery, translating devices located in the circuit of the storage battery, a motor located in a branched circuit of the storage battery, an engine connected to the shaft of the motor for converting the motor into a generator, a magnetically operated switch for closing the circuit of the motor, a circuit-closer for controlling the switch, the circuit-closer having coils connected in series and in parallel in the circuit of the battery, an instrument for completing the circuit of the coils in parallel, one of the parallel coils coacting with the series coil for closing the circuit-closer, and the other parallel coil counteracting the series coil to open the circuit of the circuit-closer.

22. In an electric system, the combination of a storage battery, translating devices located in the circuit of the storage battery, a motor connected to the storage battery, an engine connected to the shaft of the motor for converting the motor into a generator, a magnetically operated switch for completing the circuit of the motor, a circuit-closer for controlling the magnetically operated switch, a coil for closing the circuit of the circuit-closer connected in series with the translating devices, the circuit-closer having a second coil coacting with the first named coil, an instrument connected in the circuit of the series coil and translating devices for completing a circuit of the second named coil to the battery.

23. In an electric system, the combination of a storage battery, translating devices located in the circuit of the storage battery, a motor located in a branched circuit of the storage battery, an engine connected to the shaft of the motor for converting the motor into a generator, a magnetically operated switch for completing the circuit of the motor, a circuit-closer for controlling the magnetically operated switch, a coil for closing the circuit of the circuit-closer connected in series with the translating devices, the circuit-closer having a second coil coacting with the first named coil, and a third coil counteracting with the first named coil, an instrument located in the circuit of the series coil and the translating devices for closing the circuit of the second and third named coils when predetermined quantities of current of certain directions pass through the instrument.

24. In an electric system, the combination of a storage battery, translating devices located in the circuit of the storage battery, a motor located in a branched circuit of the storage battery, an engine connected to the shaft of the motor for converting the motor into a generator, a magnetically operated switch for closing the circuit of the motor, a magnetically operated switch for opening the circuit of the translating devices and the motor, a circuit-closer for controlling the operation of the first named switch, the circuit-closer having magnetic means for closing and opening the circuit of the circuit-closer, an instrument located in the circuit of the translating devices for causing the operation of the said magnetic means for closing and opening the circuit-closer, and also means for opening the second named magnetically operated switch.

25. In an electric system, the combination of a storage battery, translating devices located in the circuit of the storage battery, a motor located in a branched circuit of the storage battery, an engine connected to the shaft of the motor for converting the motor into a generator, a magnetically operated switch for closing the circuit of the motor, a magnetically operated switch for opening the circuit of the translating devices and the motor, a circuit-closer for controlling the operation of the first named switch, the circuit-closer having magnetic means for closing and opening the circuit of the circuit-closer, an instrument located in the circuit of the translating devices for causing the operation of the said magnetic means for closing and opening the circuit-closer, and also means for opening the second named magnetically operated switch, a second instrument connected in the circuit of the motor for operating the second named switch when a predetermined quantity of current passes through the second named instrument unless the motor is converted into a generator by the operation of the engine.

26. In an electric system, the combination of a storage battery, translating devices located in the circuit of the storage battery, a motor located in the branched circuit of the storage battery, an engine connected to the shaft of the motor for converting the motor into a generator, a magnetically operated switch for completing the circuit of the motor, a magnetically operated switch for opening the circuit of the translating devices and the motor, a circuit-closer for closing the circuit of and controlling the first named switch and connected in the circuit of the translating devices and having a magnetic coil for operating the circuit-closer connected in the circuit of the translating devices, and having coils, one coacting with the first named coil and the other counteracting with the first named coil, an instrument for connecting the last two named coils in the circuit of the battery when predetermined quantities of current of certain direction pass through the instrument for closing the circuit-closer when the translating devices consume a large number of watts, and when the storage battery falls below normally charged condition, and to open the circuit-closer when the watts consumed are reduced and when the battery reaches normally charged condition.

27. In an electric system, the combination of a storage battery, translating devices located in the circuit of the storage battery, a motor located in a branched circuit of the storage battery, an engine connected to the shaft of the motor for converting the motor into a generator, a magnetically operated switch for completing the circuit of the motor, a magnetically controlled switch for opening the circuit of the translating devices and the motor, a circuit-closer for closing the circuit of and controlling the first named magnetically operated switch, the circuit-closer having a coil in series with the translating devices, and a pair of coils, one coacting with the series coil and the other counteracting with the series coil, an instrument connected in series with the series coil and the translating devices and connected to the last two named coils of the circuit controller, and with the second named switch for completing the circuit of the coils with the battery and with the magnetic switch, whereby the circuit-closer will be closed by the consumption of large current in the translating devices, and will be closed and opened by the instrument closing and opening the last two mentioned coils when predetermined quantities of current in certain directions pass through the instrument, and the second named magnetic switch will be opened when a predetermined quantity of current passes through the instrument.

28. In an electric system, the combination of a storage battery, translating devices located in the circuit of the storage battery, a motor located in a branched circuit of the storage battery, an engine connected to the shaft of the motor for converting the motor into a generator, a magnetically controlled switch for completing the circuit of the motor, a magnetically controlled switch for opening the circuit of the motor and translating devices, a circuit-closer for closing the circuit of and controlling the first named magnetically operated switch, the circuit-closer having a coil in series with the translating devices, and a pair of coils, one coacting with the series coil, and the other counteracting with the series coil, an instrument connected in series with the series coil and the translating devices and connected to the last two named coils of the circuit controller, and with the second named switch for completing the circuit of the coils with the battery and with the magnetic switch, a second instrument located in the circuit of the motor and connected to the second named magnetic switch, whereby the circuit-closer will be closed when a large current is consumed by the translating devices, and closed and opened when certain quantities in certain directions of current pass through the first named instrument and the second named magnetic switch will be opened by the operation of the second named instrument when a certain quantity of current passes through the motor unless the engine converts the motor into a generator.

29. In an electric system, the combination of a storage battery, a dynamo and a translating device connected in parallel, an instrument connected in parallel with the translating devices and in series with the storage battery and the dynamo, a switch for opening and closing the circuit of the dynamo and the battery and controlled by the instrument, and a second instrument connected in series with the translating devices, a second switch for opening and closing the circuit of the storage battery and controlled by the second named instrument.

30. In an electric system, the combination of a storage battery, a dynamo and a translating device connected in parallel, an instrument connected in parallel with the translating devices and in series with the storage battery and the dynamo, a switch for opening and closing the circuit of the dynamo and the battery and controlled by the instrument, a second instrument connected in series with the translating devices, a second switch for opening and closing the circuit of the storage battery and controlled by the second named instrument, a second switch for opening and closing the circuit of the dynamo and controlled by the second named instrument.

31. In an electric system, the combination of a storage battery, a dynamo and a translating device connected in parallel, an instrument connected in parallel with the translating devices and in series with the storage battery and the dynamo, a switch for opening and closing the circuit of the dynamo and the battery and controlled by the instrument, a second instrument connected in series with the translating devices, a second switch for opening and closing the circuit of the storage battery and dynamo and controlled by the second named instrument.

32. In an electric system, the combination of a storage battery, a dynamo and a translating device connected in parallel, an instrument connected in parallel with the translating devices and in series with the storage battery and the dynamo, a switch connected in the circuit of the dynamo and the battery, and means controlled by the instrument for causing the switch to open the circuit, a second instrument connected in series with the translating devices, a second switch connected in the circuit of the storage battery and controlled by the second named instrument to open and close the circuit of the storage battery.

33. In an electric system, the combination of a storage battery, a dynamo and a translating device connected in parallel, an instrument connected in parallel with the translating devices and in series with the storage battery and the dynamo, a switch connected in the circuit of the dynamo and the battery, and means controlled by the instrument for causing the switch to open the circuit, a second instrument connected in series with the translating devices, a second switch connected in the circuit of the dynamo and controlled by the second named instrument to close and open the circuit of the dynamo.

34. In an electric system, the combination of a storage battery, a dynamo and a translating device connected in parallel, an instrument connected in parallel with the translating devices and in series with the storage battery and the dynamo, a switch connected in the circuit of the dynamo and the battery, and means controlled by the instrument for causing the switch to open the circuit, a second instrument connected in series with the translating devices, a second switch connecting the circuit of the storage battery and dynamo and controlled by the second named instrument to open and close the circuit of the storage battery and the dynamo.

35. In an electric system the combination of a storage battery, translating devices, an internal combustion engine, a motor connected to the engine for starting the engine, the motor and the translating devices connected to the storage battery in parallel circuits, an instrument connected in the motor circuit which is in parallel with the translating devices, a switch for opening the connection of the battery with the said circuits and operated by the instrument upon the passage of a predetermined number of coulombs from the battery through the motor.

In testimony whereof, I have hereunto signed my name to this specification.

MARK C. COSGRAY.